(12) United States Patent
Medina

(10) Patent No.: US 11,551,252 B1
(45) Date of Patent: Jan. 10, 2023

(54) SYSTEM FOR A PRODUCT BUNDLE AND RELATED METHODS

(71) Applicant: Inmar Clearing, Inc., Winston-Salem, NC (US)

(72) Inventor: Diana Medina, Winston-Salem, NC (US)

(73) Assignee: INMAR CLEARING, INC., Winston-Salem, NC (US)

(*) Notice: Subject to any disclaimer, the term of this patent is extended or adjusted under 35 U.S.C. 154(b) by 0 days.

(21) Appl. No.: 17/356,078

(22) Filed: Jun. 23, 2021

(51) Int. Cl.
  *G06Q 30/02* (2012.01)
  *G06Q 30/06* (2012.01)
  *G06Q 20/20* (2012.01)
  *G06F 16/9535* (2019.01)
  *G06F 16/906* (2019.01)
  *H04L 67/50* (2022.01)

(52) U.S. Cl.
  CPC ....... *G06Q 30/0224* (2013.01); *G06F 16/906* (2019.01); *G06F 16/9535* (2019.01); *G06Q 20/202* (2013.01); *G06Q 30/0222* (2013.01); *G06Q 30/0226* (2013.01); *G06Q 30/0238* (2013.01); *G06Q 30/0631* (2013.01); *H04L 67/535* (2022.05)

(58) Field of Classification Search
  CPC ........... G06Q 30/0224; G06Q 30/0226; G06Q 30/0222; G06Q 30/0631; G06Q 30/0238; H04L 67/22; G06F 30/27; G06N 20/00
  See application file for complete search history.

(56) References Cited

U.S. PATENT DOCUMENTS

| | | | |
|---|---|---|---|
| 7,980,466 B2 | 7/2011 | Lee et al. | |
| 8,700,493 B2 | 4/2014 | Cao | |
| 2012/0084174 A1* | 4/2012 | Yang | G06Q 20/123 705/26.8 |
| 2012/0245988 A1* | 9/2012 | Pace | G06Q 30/0283 705/14.25 |
| 2013/0185161 A1* | 7/2013 | Letca | G06Q 30/0261 705/14.66 |
| 2014/0224878 A1* | 8/2014 | Walker | G06Q 30/0631 235/462.01 |
| 2021/0056580 A1* | 2/2021 | Walker | G06Q 30/0234 |

OTHER PUBLICATIONS

Grace Baldwin, What is Bundle Pricing, Aug. 25, 2020, Omniaretail. com (Year: 2020).*

* cited by examiner

*Primary Examiner* — E Carvalho
(74) *Attorney, Agent, or Firm* — Allen, Dyer, Doppelt + Gilchrist, P.A.

(57) ABSTRACT

A system for a product bundle for purchase may include a user device associated with a given user, and a promotional server. The promotional server may obtain historical online browsing data associated with the given user, and obtain historical shopping data associated with the given user. The promotional server may also generate the product bundle based upon the historical shopping data and the historical online browsing data. The product bundle may include complementary products for purchase each having a purchase price associated therewith. The product bundle may have a bundle price that is less than a sum of purchase prices of each of the complementary products. The promotional server may communicate the product bundle and the bundle price to the user device for display thereon, generate a digital promotion redeemable toward the purchase of the product bundle, and communicate the digital promotion to the user device.

23 Claims, 5 Drawing Sheets

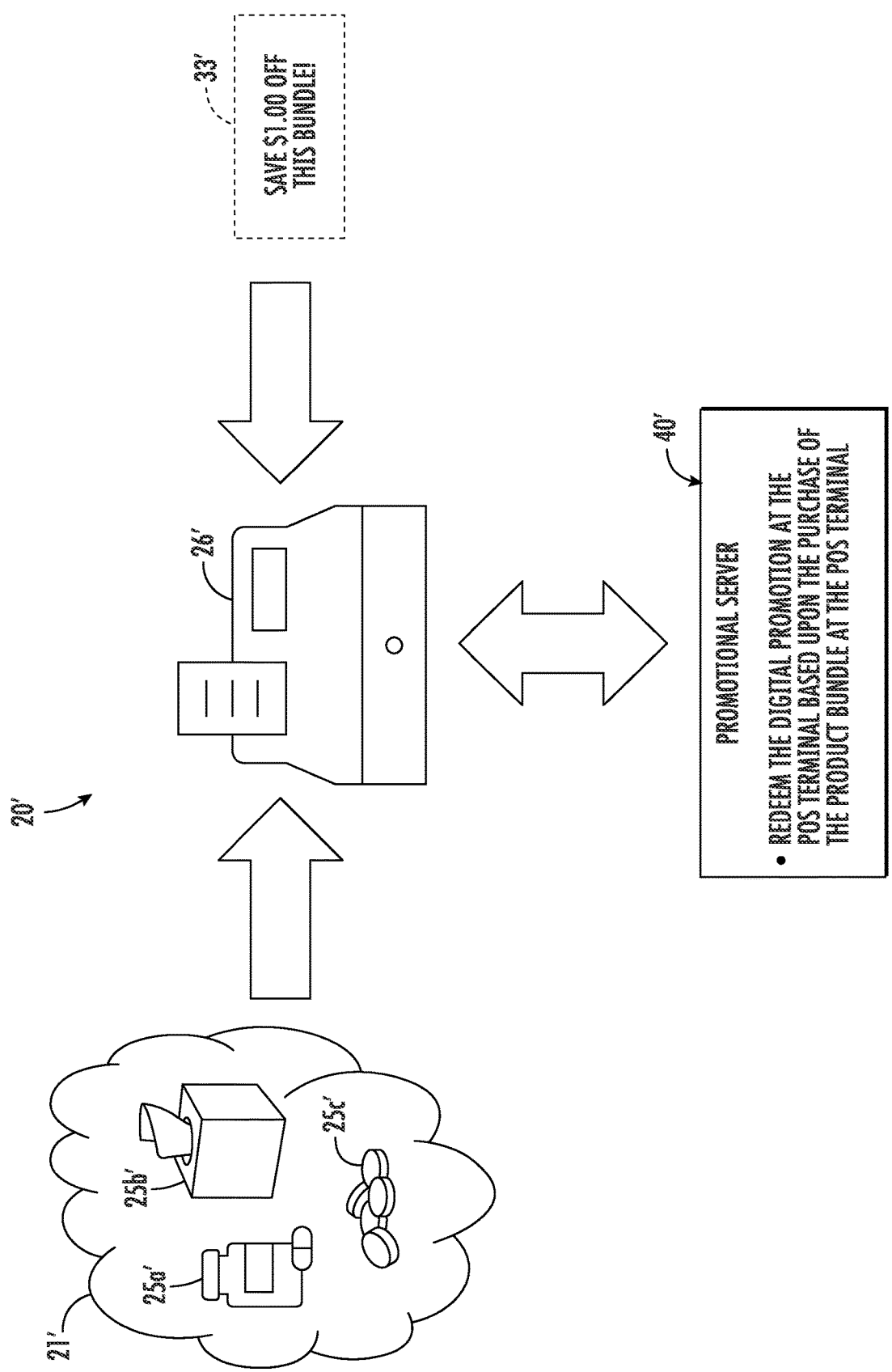

SYSTEM FOR A PRODUCT BUNDLE AND RELATED METHODS

TECHNICAL FIELD

The present invention relates to the field of electronics, and more particularly, to generating a product bundle based upon online browsing data and related methods.

BACKGROUND

Product bundling may be considered the offering of several products or services for sale as one combined product or service package. For example, a shopper may purchase a product bundle that includes several products that may be purchased individually. One example of a product bundle may be with respect to fast food, whereby a customer may purchase a "meal" instead of the items in the meal individually.

Sales of a particular product or service may be based upon how well that product or service is marketed to a consumer. One form of marketing is a coupon, typically in paper form, for a discount toward the product or service. Some coupons may be retailer-specific, for example, only redeemable for the discount at a particular retailer, while other coupons may be product-specific from a manufacturer and redeemable at any retailer.

A coupon, while typically in paper form, may be in digital form and may be referred to as a digital promotion. A digital promotion may be selected or "clipped" via a mobile phone and saved to a digital wallet for redemption at a point-of-sale (POS) terminal, for example. A typical coupon is applicable to a given product and has a redeemable value that may vary based upon the quantity of a given item, for example, brand of item, size of the product in terms of packaging, and/or the price point of the given item. A typical coupon may also be redeemable only at a given retailer and/or within a threshold time period.

SUMMARY

A system for generating a product bundle for purchase may include a user device associated with a given user, and a promotional server. The promotional server may be configured to obtain historical online browsing data associated with the given user, and obtain historical shopping data associated with the given user. The promotional server may also be configured to generate the product bundle for purchase based upon the historical shopping data and the historical online browsing data. The product bundle may include a plurality of complementary products for purchase each having a purchase price associated therewith. The product bundle may have a bundle price that is less than a sum of purchase prices of each of the complementary products. The promotional server may be configured to communicate the product bundle for purchase and the bundle price to the user device, generate a digital promotion redeemable toward the purchase of the product bundle, and communicate the digital promotion to the user device.

The promotional server may be configured to obtain the historical online browsing data from an e-commerce platform associated with a given retailer, and obtain the historical shopping data from the e-commerce platform associated with the given retailer. The promotional server may be configured to permit purchase of the product bundle via the e-commerce platform and apply the digital promotion to the purchase of the product bundle via the e-commerce platform, for example.

The system may further include a point-of-sale (POS) terminal at a retailer for processing a purchase of the product bundle. The promotional server may be configured to communicate with the POS terminal to redeem the digital promotion thereat based upon the purchase of the product bundle at the POS terminal, for example.

The user device may be configured to execute a web browser application. The historical online browsing data may include web browsing history data obtained via the web browser application, for example. The historical online browsing data may include tracking cookie data, for example.

The user may have a loyalty program account associated therewith. The promotional server may be configured to obtain the historical shopping data based upon the loyalty program account, for example.

The user may have a user identifier associated therewith. The promotional server may be configured to obtain the historical shopping data based upon the associated user identifier, for example.

The promotional server may be configured to determine a category of products searched based upon the historical online browsing data and generate the product bundle to include products in the category of products searched, for example. The promotional server may be configured to determine a user-preferred brand based upon the historical shopping data and generate the product bundle to include products of the user-preferred brand, for example.

A method aspect is directed to a method of generating a product bundle for purchase. The method may include using a promotional server to obtain historical online browsing data associated with a given user, and obtain historical shopping data associated with the given user. The method may also include using the promotional server to generate the product bundle for purchase based upon the historical shopping data and the historical online browsing data. The product bundle may include a plurality of complementary products for purchase each having a purchase price associated therewith. The product bundle may have a bundle price that is less than a sum of purchase prices of each of the complementary products. The method may further include using the promotional server to communicate the product bundle for purchase and the bundle price to a user device associated with the given user, generate a digital promotion redeemable toward the purchase of the product bundle, and communicate the digital promotion to the user device.

A computer readable medium aspect is directed to a non-transitory computer readable medium for generating a product bundle for purchase. The non-transitory computer readable medium includes computer executable instructions that when executed by a processor cause the processor to perform operations. The operations may include obtaining historical online browsing data associated with a given user and obtaining historical shopping data associated with the given user. The operations may also include generating a product bundle for purchase based upon the historical shopping data and the historical online browsing data. The product bundle may include a plurality of complementary products for purchase each having a purchase price associated therewith. The product bundle having a bundle price that is less than a sum of purchase prices of each of the complementary products. The operations may also include communicating the product bundle for purchase and the bundle price to a user device associated with the given user, generating a digital promotion redeemable toward the purchase of the product bundle, and communicating the digital promotion to the user device.

BRIEF DESCRIPTION OF THE DRAWINGS

FIG. 5 is a schematic diagram of a portion of a system for a product bundle in accordance with another embodiment.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
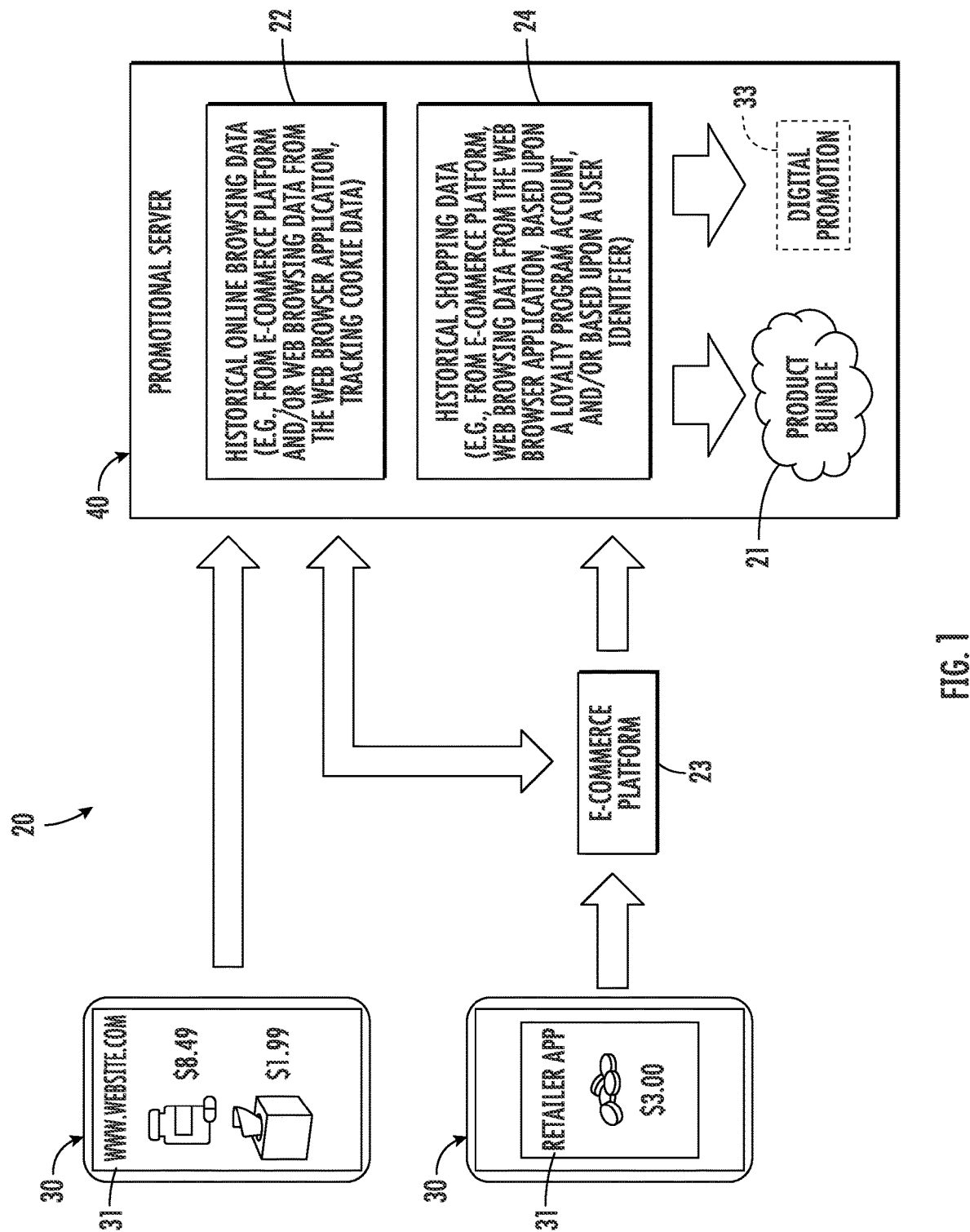
FIG. 1 is a schematic diagram of a system for a product bundle in accordance with an embodiment.
Figure 2:
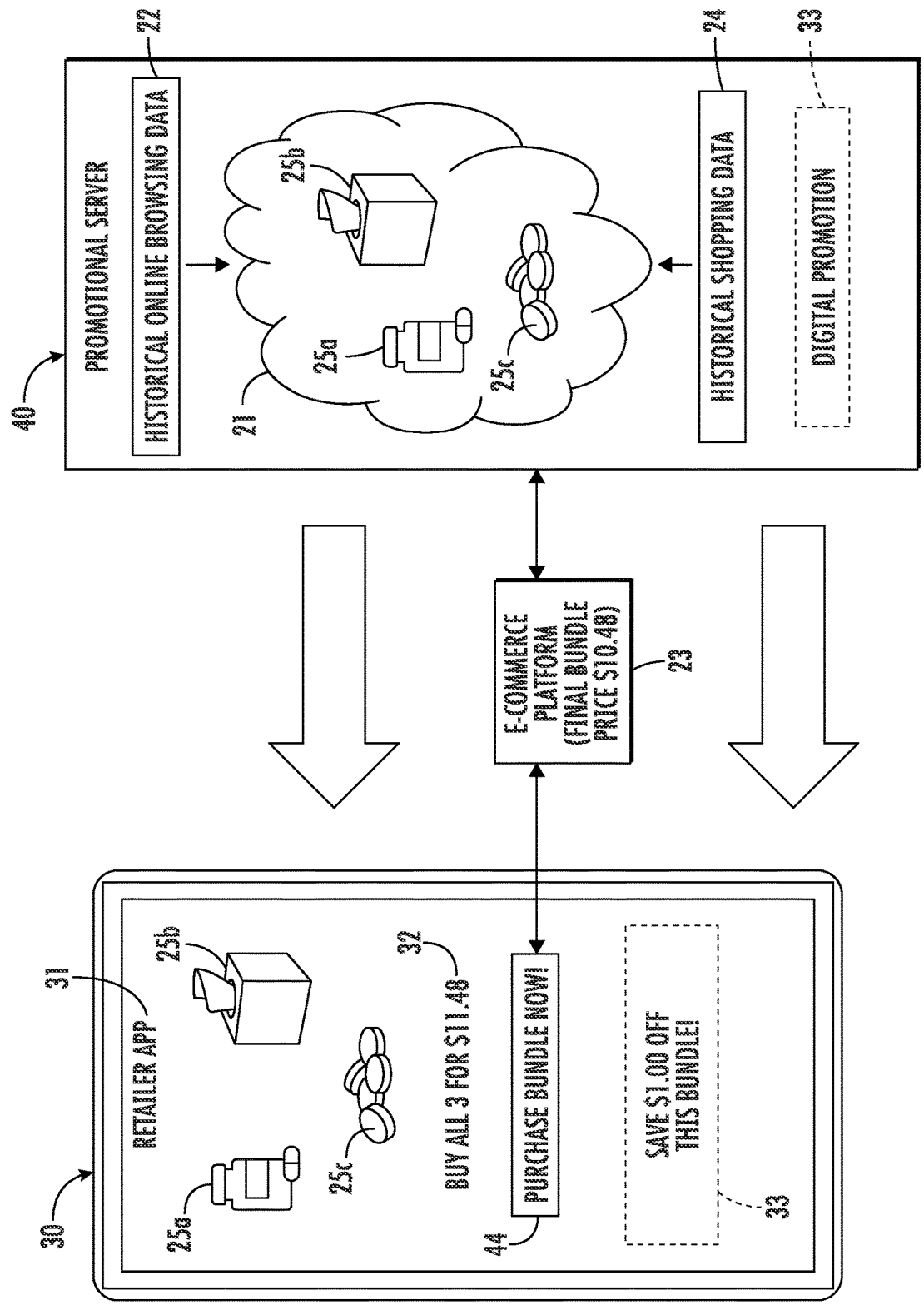
FIG. 2 is another schematic diagram of a system for a product bundle in accordance with an embodiment.
Figure 3:
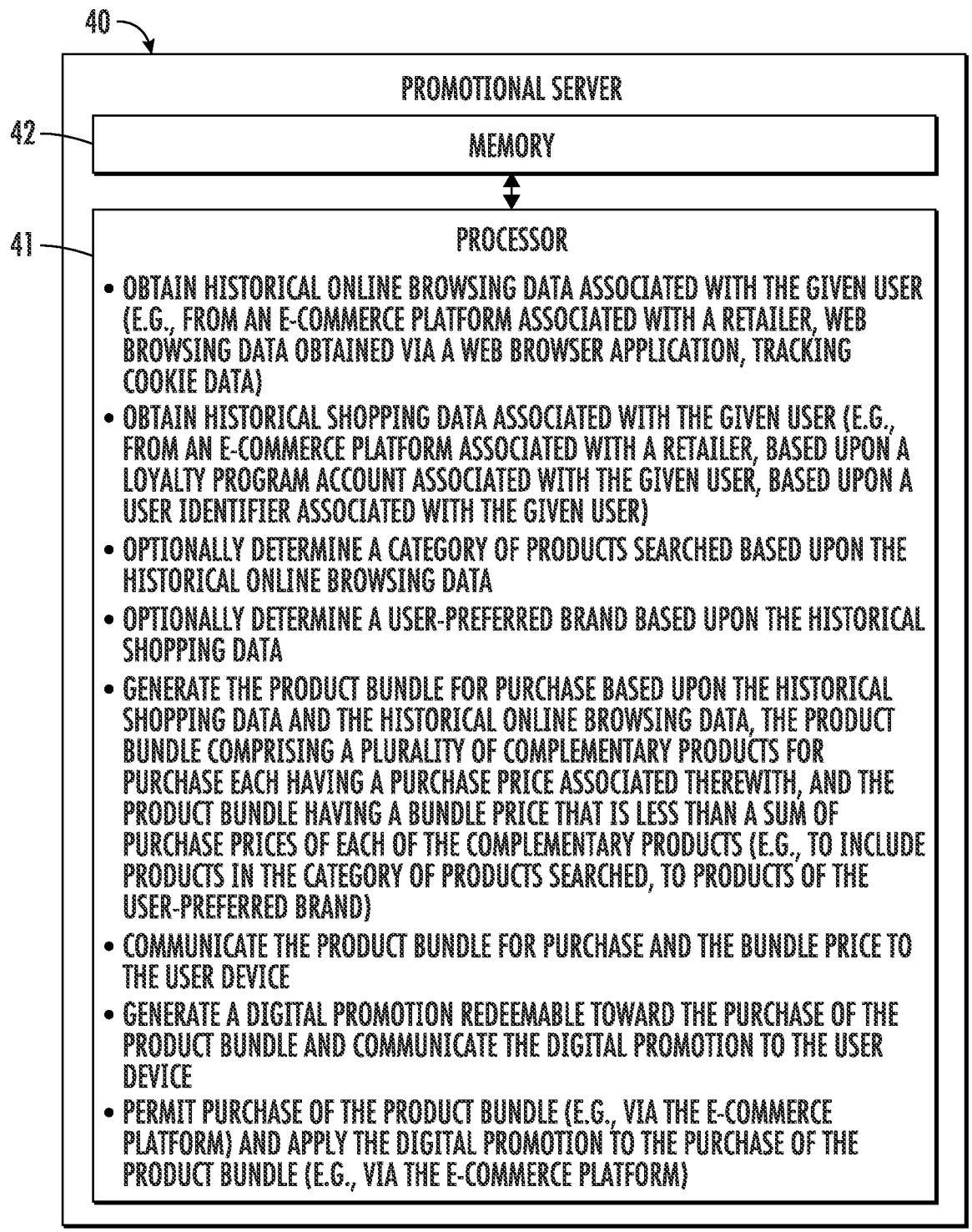
FIG. 3 is a schematic block diagram of a promotional server of a system for a product bundle in accordance with an embodiment.

Referring initially to FIGS. 1-3, a system 20 for a product bundle 21 for purchase includes a user device 30 associated with a given user. The user device 30 is illustratively in the form of a mobile wireless communications device, or more specifically a mobile phone. Of course, the user device 30 may be in the form of another type of device, for example, a tablet computer, desktop computer, laptop computer, or wearable device.

The user device 30 operates or executes an application 31. The application 31 may be associated with a retailer, for example, and may permit the given user to search for products and/or services within the application, and purchase selected products and/or services within the application. The application 31 may also be a web browser application that permits the given user to browse websites, either e-commerce or informational.

The system 20 also includes a promotional server 40. The promotional server includes a processor 41 and an associated memory 42. While operations of the promotional server 40 are described herein, those skilled in the art will appreciate that the operations are performed through cooperation between the processor 41 and the memory 42.

Figure 4:
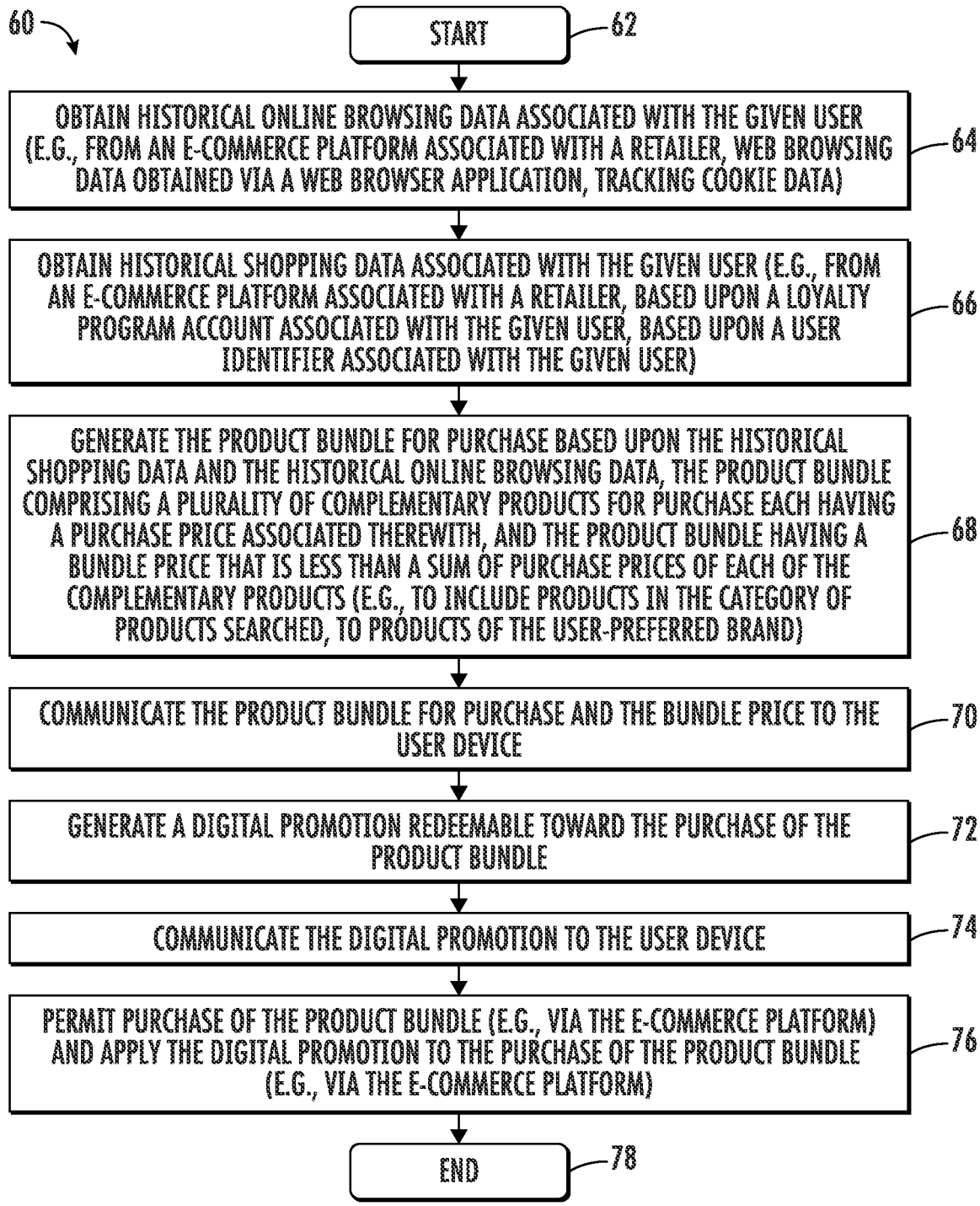
FIG. 4 is a flow diagram of operation of the promotional server of FIG. 3.

Referring now to the flowchart 60 in FIG. 4, beginning at Block 62, operations of the promotional server 40 as it relates to a product bundle 21 for purchase will now be described. At Block 64, the promotional server 40 obtains historical online browsing data 22 associated with the given user. More particularly, the promotional server 40 may cooperate with the application 31 to exchange historical online browsing data 22. Where the application 31 is associated with a retailer, for example, where the application is part of an e-commerce platform 23 associated with the retailer, the promotional server 40 may obtain the historical online browsing data 22 from the e-commerce platform 23. The historical online browsing data 22 may include prices and descriptions of products searched or browsed by the given user. For example, using tracking technologies, such as, for example, tracking cookies, information about whether a given product or service has been displayed on the user device 30 or selected or clicked on by the user (e.g., to display a product specific page) may be included within the historical online browsing data 22.

Where the application 31 executed by the user device 30 is a web browser, the historical online browsing data 22 may include web browsing history data, and the promotional server 40 may obtain the web browsing history data from the web browser. Similarly to the where the application 31 is part of an e-commerce platform 23, when the application is in the form of a web browser, the web browsing history data 22 may include web pages searched or reached, prices and descriptions of products searched or browsed by the given user, either within a given website or a search engine. For example, using tracking technologies, such as, for example, tracking cookies, click activity including click-through information, website and/or webpage dwell time, information about which websites had been visited, whether a given product or service has been displayed on the user device 30 or selected or clicked on by the user (e.g., to display a product specific page), may be obtained by the promotional server 40.

In some embodiments, the historical online browsing data 22 may include historical shopping data from multiple e-commerce platforms. Moreover, the historical online browsing data 22 may include both historical shopping data from one or more e-commerce platforms and web browsing history data.

The promotional server 40 obtains historical shopping data 24 associated with the given user (Block 66). More particularly, the promotion server 40 may cooperate with one or more servers or databases to obtain a product purchase history for the given user, which may include, for historical purchased products, a product description, a date of purchase, a price paid, and other items purchased during a same purchase transaction. For example, where a given retailer operates an e-commerce platform 23, the historical shopping data 24 may be obtained from the e-commerce platform associated with the given retailer.

In some embodiments, the given user may be associated with a loyalty program account for a given retailer. The promotional server 40 may thus obtain the historical shopping data 24 based upon the loyalty program account. More particularly, the promotional server 40 may cooperate with a loyalty application or otherwise obtain loyalty program account access information for the given user. The promotional server 40 may use the loyalty program account access information to access the loyalty program account, for example, from a remote computer administrating the loyalty program account. In some embodiments, the loyalty program account may be served or administrated by the promotional server 40. The historical shopping data 24 obtained from the loyalty program account may, in addition to the data described above, include promotion usage (e.g., digital coupons clipped and/or redeemed). The promotional server 40 may obtain the historical shopping data 24 based upon corresponding loyalty program accounts for the given user at different retailers.

The given user may alternatively or additionally have a user identifier associated therewith. The user identifier may be a username, phone number, email address, or other identifier, for example, that may be used to access a retailer website, e-commerce platform, or an account associated with the given user. The user identifier may also be any type of tracking identifier for tracking historical shopping data, either online in an e-commerce environment and/or in-store. The promotional server 40 may obtain the historical shopping data 24 based upon the user identifier. The user identifier may be used as a basis for obtaining the historical shopping data 24. The promotional server 40 may obtain the historical shopping data 24 based upon both the user identifier and loyalty program account. The promotional server 40 may obtain the historical shopping data 24 based upon other programs or identifiers associated with the given user, for example, payment card or bank account numbers.

The promotional server 40, at Block 68, generates a product bundle 21 for purchase based upon the historical shopping data 24 and the historical online browsing data 22. The product bundle 21 includes complementary products 25a-25c for purchase. Complementary products may be considered products that are sold separately but that are used together, each creating a demand for the other. For example, complementary products may include milk and cereal, and tissues and cold medicine. While three complementary products 25a-25c have been illustrated, it will be appreciated that there may be any number of products greater than one in the product bundle 21.

The promotional server 40 may determine a category or products searched based upon the historical online browsing data 22, for example. Thus, the promotional server 40 may generate the product bundle 21 to include products in a same category of the product searched. For example, if the given user is searching items related to a cold or sickness, the promotional server 40 may generate the product bundle 21 to include products that are used to address or treat cold symptoms.

The promotional server 40 may also determine a user-preferred brand based upon the historical shopping data 24. The promotional server 40 may thus generate the product bundle 21 to include products of the user-preferred brand. For example, if the given user typically purchases Brand-T products, a bundle that includes Brand-T products may be generated by the promotional server 40.

Moreover, the product bundle 21 has a bundle price 32 that is less than a sum of purchase prices of each of the complementary products 25a-25c. The promotional server 40 may set the value of the bundle 21 based upon product demand or a number of times the product bundle is generated. For example, if the promotional server 40 generates a product bundle 21 that includes tissues often because of increased sickness in a geographic area relative to the given user, the promotional server may set the bundle price 32 to be closer to the sum of the individual prices of each product that makes up the bundle. The promotional server 40 may set the bundle price 32 based upon the historical shopping data 24, for example, loyalty program data.

Current pricing of the complementary products 25a-25c, which may be used as a basis for setting the pricing, may be obtained by the promotional server 40 from a corresponding retailer, for example, via an associated e-commerce platform 23 or point-of-sale (POS) terminal system. The promotional server 40 may select a given retailer from which to obtain current pricing based upon the historical online browsing data 22 and the historical shopping data 24, for example, whether the given user has searched the retailer and how often or recently, and whether the given user has recently shopped a given retailer, for example, as a preferred retailer. Of course, more than one retailer or source may be used by the promotional server 40 to set the bundle price 32.

Moreover, the existence of a promotion, for example, a digital promotion, coupon, or rebate may be used by the promotional server 40 to set the bundle price. For example, if there is a digital coupon 33 applicable to the bundle, the promotional server 40 may set the bundle price 32 to be closer to the sum of each of the products for purchase that make up the product bundle 21.

The promotional server 40 may use machine learning as basis for generating the product bundle. More particularly, the promotional server 40 may use the obtained historical online browsing data 22 and obtained historical shopping data 24 to learn the given user's traffic and purchase patterns. For example, the promotional server 40 may determine that the given user may typically purchase donuts when the given user is feeling ill based upon purchases or medicines or sickness related product either concurrently or proximate in time with the purchase of the donuts. The promotional server 40 accepts as input for the purposes of machine learning, on an on-going basis, the historical online browsing data 22 and the historical shopping data 24 to determine patterns of product purchases. The machine learning algorithm may also accept as input historical online browsing data 22 and the historical shopping data 24 from other users which may share similarities with the given user, for example, geographically proximate, having a same retailer preference, and/or having a same brand preference. Using data of other users, the promotional server 40 may refine the products to be included within the product bundle 21 that have a greater chance of being purchased by the given user.

As will be appreciated by those skilled in the art, an increased number of aspects of consumer behavior can be ingested by the promotional server 40, including past purchase and online behavior data, as well as trigger specific bundles depending on behavior in the current event, for example, when the shopper "clicks" on a particular section of the site (a category or department page, a promotional unit) and based on related products. In this case, the machine learning algorithm can suggest a bundle that is more likely to get purchased based on present behavior. The promotional server 40 can also use data on past purchases of similar users when presented with similar bundles, and will optimize based on likelihood to purchase, updating specific products or brands to increase purchase conversion. The promotional server 40 may also consider data on category and brand affinity, meaning the server recommends products in the same categories that the shopper has purchased before, or from the same brands in alternative categories.

Of course, other inputs may be provided to the machine learning algorithm, for example, with respect to issuance and redemption of digital promotions or coupons. For example, if a given user was issued or saved a digital promotion, but did not redeem the digital promotion or coupon, the promotional server 40 may determine that the product associated with the digital promotion should not be included in the product bundle. In contrast, if the given user typically redeems the digital promotion, the promotional server 40 may include the associated product in the product bundle 21.

In some embodiments, the promotional server 40 may determine not to include the associated product in the product bundle if the given user nearly always redeems or applied a coupon or digital promotion for the associated product, as this may be indicative that the given user may have a propensity to purchase the product without bundling. The promotional server 40 via machine learning algorithm, based upon the inputs, may determine a threshold of whether a product is included in the product bundle 21. The promotional server 40 may also consider the habits of other users with respect to digital promotions.

In an exemplary implementation example, a given user may be searching online for best cold medicines for certain symptoms (i.e., a given category of products). The given user may also be searching for coupons or sale pricing of tissues and cold medicines. The given user may also have previously purchased Brand-T tissues, and Cold-B-Gone Brand cold medicine together (i.e., a user-preferred brand). The promotional server 40 may obtain this information as described above. Brand-T tissues and Cold-B-Gone cold medicine currently sell individually at a given or preferred retailer for $1.99 and $8.49, respectively. The promotional server 40 may thus generate the product bundle 21 to include Brand-T tissues, Cold-B-Gone cold medicine, and Super-Sore lozenges, which currently sell individually for $3.00 at the given retailer, for $11.48.

The promotional server 40, once the product bundle 21 for purchase has been generated, communicates the product bundle for purchase and the bundle price 32 to the user device 30 (Block 70). For example, where the user device 30 is in the form of mobile wireless communications device, the promotional server 40 may wirelessly communicate the product bundle 21 and the bundle price 32. In some embodiments, for example, where the user device 30 operates or executes an application associated with the retailer, the product bundle 21 for purchase and the bundle price 32 may appear within the application or as a notification on the user device. In embodiments, for example, the product bundle 21 and the bundle price 32 may be appear or be displayed alongside search results with the corresponding retailer or retailers where the product bundle for purchase can be purchased, for example by providing input to a prompt 44 to purchase the product bundle.

At Block 72, the promotional server 40 generates a digital promotion 33 redeemable toward the purchase of the product bundle 21. The digital promotion 33 is illustratively in the form of a digital coupon. The digital promotion 33 may be in the form of a digital rebate, for example. At Block 74, the digital promotion 33 is communicated to the user device 30.

The digital promotion 33 may be saved to a digital wallet associated with the given user, for example, across multiple retailers or associated with a given retailer (e.g., within the retailer's loyalty program or application). As described above, whether the given user has saved the digital promotion 33 to an associated digital wallet (i.e., clipped the digital promotion) may be used by the promotional server 40 to learn search and purchase patterns of the given user, to determine products included in the product bundle 21 and the corresponding bundle price 32. Similarly, the promotional server 40 may also determine products included in the product bundle 21 for purchase and the corresponding bundle price 32 based upon whether the digital promotion 33 is redeemed.

The promotional server 40, at Block 76, permits purchase of the product bundle 21, for example, via the e-commerce platform 23 associated with the given retailer, and applies the digital promotion 33 to the purchase of the bundle via the e-commerce platform. In other words, the promotional server 40 permits the given user to make an in-app or online purchase of the product bundle 21 and apply the digital promotion 33. Operations end at Block 78.

Referring now to FIG. 5, in another embodiment, the system 20' includes a POS terminal 26' at a retailer for processing a purchase of the product bundle 21' including the complementary products 25a'-25c'. The promotional server 40' communicates with the POS terminal 26' to redeem the digital promotion 33' thereat based upon the purchase of the product bundle 21' at the POS terminal. In other words, the product bundle 21' is purchased at a physical store, as opposed to an e-commerce platform, as described above, and the digital promotion 33' is redeemed also at the physical store.

Those skilled in the art will be appreciate that while embodiments have been described herein with respect to purchase of the product bundle 21 via an e-commerce platform 23 and at a POS terminal 26', operations of the promotional server 40 described above with respect to obtaining the historical online browsing data 22 and historical shopping data 24, and generating the product bundle 21, including determining the bundle price 32, may be applicable regardless of whether the product bundle is purchased via an e-commerce platform or at a physical location via a POS terminal. Moreover, the promotional server 40 may, in some embodiments, permit purchase of the product bundle 21 either via the e-commerce platform 23 or via a POS terminal 26' at a physical location, which may be particularly useful if a given retail operates both an e-commerce platform and a physical store.

A method aspect is directed to a method of generating a product bundle 21 for purchase. The method includes using a promotional server 40 to obtain historical online browsing data 22 associated with a given user, and obtain historical shopping data 24 associated with the given user. The method also include using the promotional server 40 to generate the product bundle 21 for purchase based upon the historical shopping data 24 and the historical online browsing data 22. The product bundle 21 includes a plurality of complementary products 25a-25c for purchase each having a purchase price associated therewith. The product bundle has a bundle price 32 that is less than a sum of purchase prices of each of the complementary products 25a-25c. The method further includes using the promotional server 40 to communicate the product bundle 21 for purchase and the bundle price 32 to a user device 30 associated with the given user, generate a digital promotion 33 redeemable toward the purchase of the product bundle, and communicate the digital promotion to the user device.

A computer readable medium aspect is directed to a non-transitory computer readable medium for generating a product bundle 21 for purchase. The non-transitory computer readable medium includes computer executable instructions that when executed by a processor 41 cause the processor to perform operations. The operations include obtaining historical online browsing data 22 associated with a given user and obtaining historical shopping data 24 associated with the given user. The operations also include generating a product bundle 21 for purchase based upon the historical shopping data 24 and the historical online browsing data 22. The product bundle 21 includes a plurality of complementary products 25a-25c for purchase each having a purchase price associated therewith. The product bundle 21 has a bundle price 32 that is less than a sum of purchase prices of each of the complementary products 25a-25c. The operations also include communicating the product bundle 21 for purchase and the bundle price 32 to a user device 30 associated with the given user, generating a digital promotion 33 redeemable toward the purchase of the product bundle, and communicating the digital promotion to the user device.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A system for a product bundle for purchase comprising:
a user device associated with a given user, the given user being from among a plurality of users; and
a promotional server configured to
obtain historical online browsing data associated with the plurality of users,
obtain historical shopping data associated with the plurality of users,
determine other users from among the plurality of users that share similarities with the given user based upon at least one of geographic proximity to the given user, a same retailer preference as the given user, and a same brand preference as the given user,
apply machine learning to learn, on an ongoing basis, a purchase pattern of the given user based upon a machine learning algorithm that accepts as input, the obtained historical online browsing data and the obtained historical shopping data for the other users determined to share similarities with the given user, and the obtained historical online browsing data and the obtained historical shopping data for the given user,
generate the product bundle for purchase based upon the purchase pattern of the given user, the product bundle comprising a plurality of complementary products for purchase each having a purchase price associated therewith, and the product bundle having a bundle price that is less than a sum of purchase prices of each of the complementary products,
set the bundle price based upon demand for the plurality of complementary products of the product bundle within the geographic proximity to the given user, the demand being determined based upon a number of times the product bundle has been generated, and the bundle price being set so that the bundle price is set closer to the sum of the purchase prices of each of the complementary products based upon higher demand for the complementary products,
communicate the product bundle for purchase and the bundle price to the user device, and
generate a digital promotion redeemable toward the purchase of the product bundle and communicate the digital promotion to the user device.

2. The system of claim 1 wherein the promotional server is configured to obtain the historical online browsing data from an e-commerce platform associated with a given retailer, and obtain the historical shopping data from the e-commerce platform associated with the given retailer.

3. The system of claim 2 wherein the promotional server is configured to permit purchase of the product bundle via the e-commerce platform and apply the digital promotion to the purchase of the product bundle via the e-commerce platform.

4. The system of claim 1 further comprising a point-of-sale (POS) terminal at a retailer for processing a purchase of the product bundle; and wherein the promotional server is configured to communicate with the POS terminal to redeem the digital promotion thereat based upon the purchase of the product bundle at the POS terminal.

5. The system of claim 1 wherein the user device is configured to execute a web browser application; and wherein the historical online browsing data comprises web browsing history data obtained via the web browser application.

6. The system of claim 1 wherein the historical online browsing data comprises tracking cookie data.

7. The system of claim 1 wherein the given user has a loyalty program account associated therewith; and wherein the promotional server is configured to obtain the historical shopping data based upon the loyalty program account.

8. The system of claim 1 wherein the given user has a user identifier associated therewith; and wherein the promotional server is configured to obtain the historical shopping data based upon the associated user identifier.

9. The system of claim 1 wherein the promotional server is configured to determine a category of products searched based upon the historical online browsing data and generate the product bundle to include products in the category of products searched.

10. The system of claim 1 wherein the promotional server is configured to determine a user-preferred brand based upon the historical shopping data and generate the product bundle to include products of the user-preferred brand.

11. A promotional server for a product bundle comprising:
a processor and an associated memory configured to
obtain historical online browsing data associated with a plurality of users,
obtain historical shopping data associated with the plurality of users,
determine other users from among the plurality of users that share similarities with a given user from among the plurality of users based upon at least one of geographic proximity to the given user, a same retailer preference as the given user, and a same brand preference as the given user,
apply machine learning to learn, on an ongoing basis, a purchase pattern of the given user based upon a machine learning algorithm that accepts as input, the obtained historical online browsing data and the obtained historical shopping data for the other users determined to share similarities with the given user, and the obtained historical online browsing data and the obtained historical shopping data for the given user,
generate the product bundle for purchase based upon the purchase pattern of the given user, the product bundle comprising a plurality of complementary products for purchase each having a purchase price associated therewith, and the product bundle having a bundle price that is less than a sum of purchase prices of each of the complementary products,
set the bundle price based upon demand for the plurality of complementary products of the product bundle within the geographic proximity to the given user, the demand being determined based upon a number of times the product bundle has been generated, and the bundle price being set so that the bundle price is set closer to the sum of the purchase prices of each of the complementary products based upon higher demand for the complementary products,
communicate the product bundle for purchase and the bundle price to a user device associated with the given user, and generate a digital promotion redeemable toward the purchase of the product bundle and communicate the digital promotion to the user device.

12. The promotional server of claim 11 wherein the processor is configured to obtain the historical online browsing data from an e-commerce platform associated with a given retailer, and obtain the historical shopping data from the e-commerce platform associated with the given retailer.

13. The promotional server of claim 12 wherein the processor is configured to permit purchase of the product bundle via the e-commerce platform and apply the digital promotion to the purchase of the product bundle via the e-commerce platform.

14. The promotional server of claim 11 wherein the given user has a loyalty program account associated therewith; and wherein the processor is configured to obtain the historical shopping data based upon the loyalty program account.

15. The promotional server of claim 11 wherein the processor is configured to determine a category of products searched based upon the historical online browsing data and generate the product bundle to include products in the category of products searched.

16. A method for a product bundle for purchase, the method comprising:
using a promotional server to
obtain historical online browsing data associated with a plurality of users,
obtain historical shopping data associated with the plurality of users,
determine other users from among the plurality of users that share similarities with a given user from among the plurality of users based upon at least one of geographic proximity to the given user, a same retailer preference as the given user, and a same brand preference as the given user,
apply machine learning to learn, on an ongoing basis, a purchase pattern of the given user based upon a machine learning algorithm that accepts as input, the obtained historical online browsing data and the obtained historical shopping data for the other users determined to share similarities with the given user, and the obtained historical online browsing data and the obtained historical shopping data for the given user,
generate the product bundle for purchase based upon the purchase pattern of the given user, the product bundle comprising a plurality of complementary products for purchase each having a purchase price associated therewith, and the product bundle having a bundle price that is less than a sum of purchase prices of each of the complementary products,
set the bundle price based upon demand for the plurality of complementary products of the product bundle within the geographic proximity to the given user, the demand being determined based upon a number of times the product bundle has been generated, and the bundle price being set so that the bundle price is set closer to the sum of the purchase prices of each of the complementary products based upon higher demand for the complementary products,
communicate the product bundle for purchase and the bundle price to a user device associated with the given user, and
generate a digital promotion redeemable toward the purchase of the product bundle and communicate the digital promotion to the user device.

17. The method of claim 16 wherein using the processor comprises using the processor to obtain the historical online browsing data from an e-commerce platform associated with a given retailer, and obtain the historical shopping data from the e-commerce platform associated with the given retailer.

18. The method of claim 17 wherein using the processor comprises using the processor to permit purchase of the product bundle via the e-commerce platform and apply the digital promotion to the purchase of the product bundle via the e-commerce platform.

19. The method of claim 16 wherein the given user has a loyalty program account associated therewith; and wherein using the processor comprises using the processor to obtain the historical shopping data based upon the loyalty program account.

20. A non-transitory computer readable medium for a product bundle for purchase, the non-transitory computer readable medium comprising computer executable instructions that when executed by a processor cause the processor to perform operations comprising:
obtaining historical online browsing data associated with a plurality of users;
obtaining historical shopping data associated with the plurality of users;
determining other users from among the plurality of users that share similarities with a given user from among the plurality of users based upon at least one of geographic proximity to the given user, a same retailer preference as the given user, and a same brand preference as the given user,
applying machine learning to learn, on an ongoing basis, a purchase pattern of the given user based upon a machine learning algorithm that accepts as input, the obtained historical online browsing data and the obtained historical shopping data for the other users determined to share similarities with the given user, and the obtained historical online browsing data and the obtained historical shopping data for the given user;
generating a product bundle for purchase based upon the purchase pattern of the given user, the product bundle comprising a plurality of complementary products for purchase each having a purchase price associated therewith, and the product bundle having a bundle price that is less than a sum of purchase prices of each of the complementary products;
setting the bundle price based upon demand for the plurality of complementary products of the product bundle within the geographic proximity to the given user, the demand being determined based upon a number of times the product bundle has been generated, and the bundle price being set so that the bundle price is set closer to the sum of purchase prices of each of the complementary products based upon higher demand for the complementary products;
communicating the product bundle for purchase and the bundle price to a user device associated with the given user; and
generating a digital promotion redeemable toward the purchase of the product bundle and communicating the digital promotion to the user device.

21. The non-transitory computer readable medium of claim 20 wherein the operations comprise obtaining the historical online browsing data from an e-commerce platform associated with a given retailer, and obtaining the historical shopping data from the e-commerce platform associated with the given retailer.

22. The non-transitory computer readable medium of claim 21 wherein the operations comprise permitting purchase of the product bundle via the e-commerce platform and applying the digital promotion to the purchase of the product bundle via the e-commerce platform.

23. The non-transitory computer readable medium of claim 20 wherein the user has a loyalty program account associated therewith; and wherein the operations comprise obtaining the historical shopping data based upon the loyalty program account.

* * * * *